US012732342B1

(12) United States Patent
Vrubel et al.

(10) Patent No.: US 12,732,342 B1
(45) Date of Patent: Sep. 8, 2026

(54) HARDWARE-ACCELERATED EXECUTION OF LARGE LANGUAGE MODELS OVER FULLY HOMOMORPHIC ENCRYPTION

(71) Applicant: Chain Reaction, Ltd., Tel Aviv (IL)

(72) Inventors: Oren Vrubel, Tel Aviv (IL); Nimrod Borer, Atlit (IL); Ilan Rosenfeld, Petah Tikva (IL)

(73) Assignee: Reaction, Ltd., Tel Aviv (IL)

( * ) Notice: Subject to any disclaimer, the term of this patent is extended or adjusted under 35 U.S.C. 154(b) by 0 days.

(21) Appl. No.: 19/436,999

(22) Filed: Dec. 30, 2025

(51) Int. Cl.
*H04L 9/06* (2006.01)
*G06F 40/284* (2020.01)
*H04L 9/00* (2022.01)

(52) U.S. Cl.
CPC .......... *H04L 9/0618* (2013.01); *G06F 40/284* (2020.01); *H04L 9/008* (2013.01)

(58) Field of Classification Search
CPC ...... H04L 9/0618; H04L 9/008; G06F 40/284
See application file for complete search history.

(56) References Cited

U.S. PATENT DOCUMENTS

2025/0038765 A1 * 1/2025 Galvin ................ G06F 21/6245
2026/0005830 A1 * 1/2026 Zimerman ........... G06N 3/0464
2026/0046109 A1 * 2/2026 Adir ........................ H04L 9/008

OTHER PUBLICATIONS

Barla, Nilesh. "Understanding LLM Batch Inference." Adaline, retrieved Dec. 30, 2025, https://www.adaline.ai/blog/llm-batch-inference.

Gloeckle, Fabian, et al. Better & Faster Large Language Models via Multi-Token Prediction. arXiv, retrieved Dec. 30, 2025, arXiv:2404.19737, https://arxiv.org/pdf/2404.19737.

* cited by examiner

*Primary Examiner* — Hee K Song
(74) *Attorney, Agent, or Firm* — M&B IP Analysts, LLC

(57) ABSTRACT

A system and method for hardware-accelerated execution of a multi-token large language model (LLM) over fully homomorphic encryption (FHE) are presented. The method includes generating a plurality of tokens by homomorphic evaluation of a previous transformer cycle of the multi-token LLM; representing the plurality of tokens using one or more FHE ciphertext vectors; executing homomorphic transformer-layer operations on at least one of the one or more FHE ciphertext vectors using one or more layer processor devices; and performing ciphertext bootstrapping on at least another of the FHE ciphertext vectors using one or more bootstrap processor devices to refresh ciphertext noise and restore computational capacity, wherein the executing and performing steps are applied to different FHE ciphertext vectors.

29 Claims, 7 Drawing Sheets

CHRC P3510

CHRC P3510

HARDWARE-ACCELERATED EXECUTION OF LARGE LANGUAGE MODELS OVER FULLY HOMOMORPHIC ENCRYPTION

TECHNICAL FIELD

This disclosure relates, generally, to the field of computing, particularly, to privacy-preserving computation and encrypted inference, and more particularly, to hardware-accelerated execution of large language models (LLMs) over fully homomorphic encryption (FHE) using coordinated batching and pipelined processing.

BACKGROUND

Large language models (LLMs) are increasingly used to process sensitive or confidential data, creating a need for execution techniques that preserve confidentiality while maintaining practical performance. Fully homomorphic encryption (FHE) enables computation to be performed directly on encrypted data without revealing plaintext values, and multi-party fully homomorphic encryption (MP-FHE) extends this capability to multi-user settings without requiring any single party to possess a complete decryption key.

While FHE and MP-FHE provide strong privacy guarantees, their application to LLM inference presents significant technical challenges. In particular, LLMs operate in two distinct phases: a prompt-processing phase, in which representations for an entire input context are computed, and a token-generation phase, in which output tokens are produced incrementally. Although prompt processing naturally exposes many tokens concurrently, conventional token generation remains inherently autoregressive and single-token, resulting in poor parallelism.

These limitations are especially problematic in FHE schemes, which encode large vectors, often comprising tens of thousands of values, within a single ciphertext and support single-instruction-multiple-data (SIMD)-style computation. During prompt processing, ciphertext capacity can be efficiently utilized. However, during token generation, processing one token at a time leaves a substantial portion of the ciphertext unused, causing severe inefficiencies. Because the computational cost of homomorphic operations is largely dependent on how many ciphertext slots contain meaningful data, such underutilization results in disproportionate performance penalties.

Although multi-token LLM techniques have been proposed in plaintext settings to improve throughput and reasoning efficiency, simply applying such techniques under FHE does not resolve the fundamental inefficiencies caused by ciphertext noise growth, expensive bootstrapping operations, and hardware underutilization. Likewise, while MP-FHE enables secure computation across users with independent keys, it introduces additional coordination and cryptographic overhead that, absent careful system design, can outweigh its benefits.

Accordingly, there is no practical motivation to employ MP-FHE for LLM inference unless the associated overhead can be amortized. In particular, MP-FHE becomes advantageous when it enables secure user batching, allowing encrypted data from multiple users to be processed together without compromising isolation or requiring shared trust. However, existing systems do not provide execution mechanisms capable of efficiently batching tokens or users under FHE or MP-FHE while maintaining high hardware utilization during the token-generation phase.

Therefore, existing approaches to encrypted inference fail to address the combined challenges of: (1) underutilization of ciphertext capacity during token generation; (2) high bootstrapping cost; (3) inefficient hardware usage; and (4) dynamic multi-user participation under independent encryption keys. Merely supporting multi-token generation of FHE or MP-FHE, without addressing these execution-level inefficiencies, does not yield a practical or scalable solution.

Accordingly, the current landscape lacks a method and system that harnesses multi-token generation and multi-party encryption through coordinated batching and pipelined execution, such that encrypted LLM inference achieves high utilization and throughput despite the inherent costs of homomorphic computation. Thus, there exists a need for an implementation of a hardware-aware execution architecture that explicitly coordinates token batching, user batching, ciphertext layout, and pipelined processing, thereby making multi-token and MP-FHE-based LLM inference practically viable rather than merely theoretically possible.

Therefore, it would be advantageous to provide an efficient solution that would cure the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key nor critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having hardware, firmware, firmware executing on hardware, software, software executing on hardware, or any combination of them installed on the system that, in operation, causes or cause the system to perform the actions. One or more computer programs can be configured to perform particular operations or actions by virtue of including instructions that, when executed by a data processing apparatus, cause the apparatus to perform the actions.

In one general aspect, the method may include generating a plurality of tokens by homomorphic evaluation of a previous transformer cycle of the multi-token LLM; representing the plurality of tokens using one or more FHE ciphertext vectors; executing homomorphic transformer-layer operations on at least one of the one or more FHE ciphertext vectors using one or more layer processor devices; and performing ciphertext bootstrapping on at least another of the FHE ciphertext vectors using one or more bootstrap processor devices to refresh ciphertext noise and restore computational capacity, where the executing and performing steps are applied to different FHE ciphertext vectors. Other embodiments of this aspect include corresponding computer systems, apparatus, and computer programs recorded on one or more computer storage devices, each configured to perform the actions of the methods.

Implementations may include one or more of the following features. The method may include: coordinating pipelined routing of the FHE ciphertext vectors between the one or more layer processor devices and the one or more bootstrap processor devices, such that homomorphic transformer-layer processing and ciphertext bootstrapping are performed concurrently on different FHE ciphertext vectors during a token-generation phase.

The method where coordinating the pipelined execution may include alternately routing FHE ciphertext vectors between the one or more layer processor devices and the one or more bootstrap processor devices.

The method where the one or more layer processor devices execute homomorphic transformer-layer operations on a first FHE ciphertext vector while the one or more bootstrap processor devices perform ciphertext bootstrapping on a second FHE ciphertext vector.

The method where the pipelined execution improves utilization of processing resources in the one or more layer processor devices and the one or more bootstrap processor devices and increases aggregate throughput during token generation relative to single-token processing.

The method where representing the plurality of tokens using one or more FHE ciphertext vectors may include: packing or maintaining the plurality of tokens in the one or more FHE ciphertext vectors according to predetermined slot layouts.

The method where ciphertext bootstrapping is performed according to a predefined schedule determined at compile time based on an expected noise-growth profile of the multi-token LLM.

The method may include: receiving encrypted requests from a plurality of endpoint devices, each associated with a respective user.

The method may include: determining whether a plurality of users share a common encryption key context.

The method where in response to determining that the plurality of users do not share the common encryption key context, the method further may include: generating a joint shared key using a multi-party fully homomorphic encryption (MP-FHE) protocol.

The method where generating the joint shared key may include: executing a distributed or threshold key-generation protocol such that no single user possesses a complete secret key.

The method may include: establishing a batched execution session associated with the joint shared key, where the batched execution session defines an active set of users whose encrypted tokens are jointly processed.

The method where encrypted tokens associated with the active set of users are grouped into generation-phase FHE ciphertext vectors and processed using a pipelined execution.

The method may include: performing collaborative decryption of encrypted output tokens, where each user provides a partial decryption share.

Implementations of the described techniques may include hardware, a method or process, or a computer tangible medium.

In one general aspect, the system may include one or more processors configured to. generate a plurality of tokens by homomorphic evaluation of a previous transformer cycle of the multi-token LLM; represent the plurality of tokens using one or more FHE ciphertext vectors; execute homomorphic transformer-layer operations on at least one of the one or more FHE ciphertext vectors using one or more layer processor devices; and perform ciphertext bootstrapping on at least another of the FHE ciphertext vectors using one or more bootstrap processor devices to refresh ciphertext noise and restore computational capacity, where the executing and performing steps are applied to different FHE ciphertext vectors. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: coordinate pipelined routing of the FHE ciphertext vectors between the one or more layer processor devices and the one or more bootstrap processor devices, such that homomorphic transformer-layer processing and ciphertext bootstrapping are performed concurrently on different FHE ciphertext vectors during a token-generation phase.

The system where the one or more processors, when coordinating the pipelined execution, are configured to alternately route FHE ciphertext vectors between the one or more layer processor devices and the one or more bootstrap processor devices.

The system where the one or more layer processor devices execute homomorphic transformer-layer operations on a first FHE ciphertext vector while the one or more bootstrap processor devices perform ciphertext bootstrapping on a second FHE ciphertext vector.

The system where the pipelined execution improves utilization of processing resources in the one or more layer processor devices and the one or more bootstrap processor devices and increases aggregate throughput during token generation relative to single-token processing.

The system where the one or more processors, when representing the plurality of tokens using one or more FHE ciphertext vectors, are configured to: pack or maintain the plurality of tokens in the one or more FHE ciphertext vectors according to predetermined slot layouts.

The system where ciphertext bootstrapping is performed according to a predefined schedule determined at compile time based on an expected noise-growth profile of the multi-token LLM.

The system where the one or more processors are further configured to: receive encrypted requests from a plurality of endpoint devices, each associated with a respective user.

The system where the one or more processors are further configured to: determine whether a plurality of users share a common encryption key context.

The system where the one or more processors, when in response to determining that the plurality of users do not share the common encryption key context, the method, are configured to: generate a joint shared key using a multi-party fully homomorphic encryption (MP-FHE) protocol.

The system where the one or more processors, when generating the joint shared key, are configured to: execute a distributed or threshold key-generation protocol such that no single user possesses a complete secret key.

The system where the one or more processors are further configured to: establish a batched execution session associated with the joint shared key, where the batched execution session defines an active set of users whose encrypted tokens are jointly processed.

The system where encrypted tokens associated with the active set of users are grouped into generation-phase FHE ciphertext vectors and processed using a pipelined execution.

The system where the one or more processors are further configured to: perform collaborative decryption of encrypted output tokens, where each user provides a partial decryption share. Implementations of the described techniques may include hardware, a method or process, or a computer tangible medium.

In one general aspect, a non-transitory computer-readable medium may include one or more instructions that, when executed by one or more processors of a device, cause the device to: generate a plurality of tokens by homomorphic evaluation of a previous transformer cycle of the multi-token LLM; represent the plurality of tokens using one or more FHE ciphertext vectors; execute homomorphic transformer-layer operations on at least one of the one or more FHE ciphertext vectors using one or more layer processor devices; and perform ciphertext bootstrapping on at least another of the FHE ciphertext vectors using one or more bootstrap processor devices to refresh ciphertext noise and restore computational capacity, where the executing and performing steps are applied to different FHE ciphertext vectors. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings. In the drawings:

DETAILED DESCRIPTION

Figure 1:
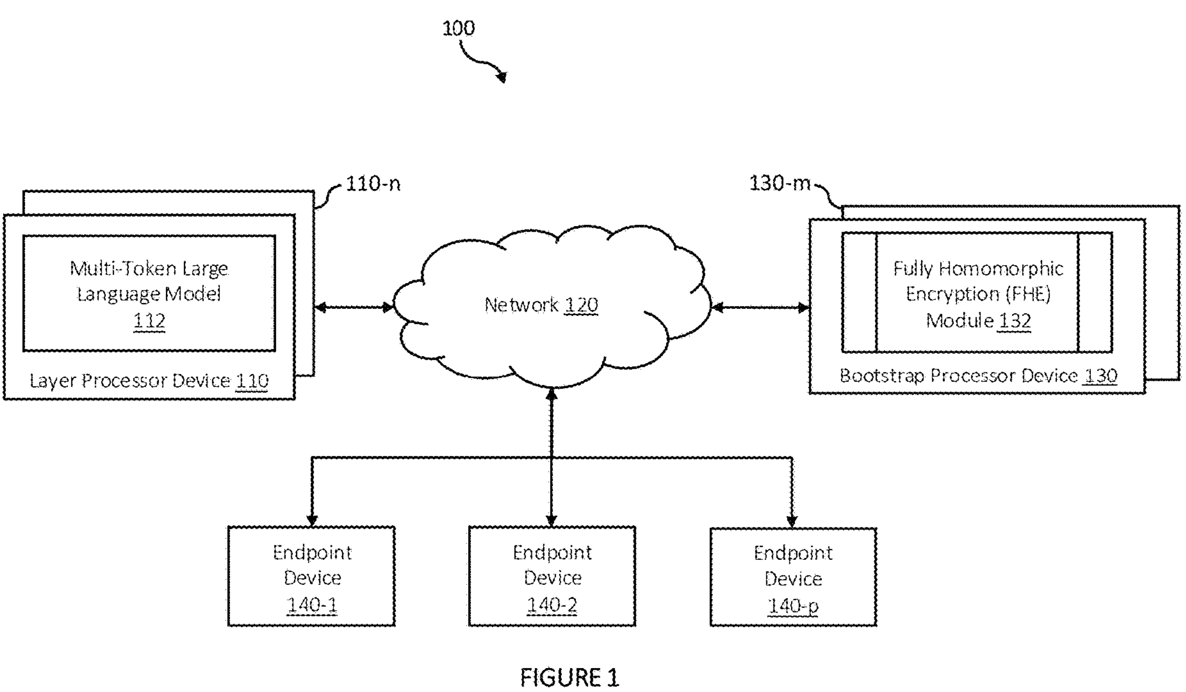
FIG. 1 illustrates a block diagram showing a system architecture for hardware-accelerated execution of multi-token large language models (LLMs) over fully homomorphic encryption (FHE) according to at least one embodiment.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

As used herein, the term "Fully Homomorphic Encryption (FHE)" refers to a class of cryptographic schemes that permit computations to be performed directly on encrypted data without decryption at any intermediate stage. When a resulting ciphertext is subsequently decrypted, the decrypted result corresponds, within scheme-specific precision bounds, to the result that would have been obtained had the computations been performed on the corresponding unencrypted data. FHE may be implemented using various schemes, including but not limited to Cheon-Kim-Kim-Song (CKKS), Brakerski-Fan-Vercauteren (BFV), Brakerski-Gentry-Vaikuntanathan (BGV), and Brakerski-Fan-Vercauteren (BFV). Such schemes enable secure and privacy-preserving computation in environments where plaintext data cannot be revealed to the computing infrastructure.

As used herein, the term "ciphertext" (also referred to as "encrypted data") refers to data encrypted under an FHE scheme, including numerical values, vectors, or tensors. The term "plaintext" refers to the corresponding unencrypted data represented by such ciphertexts prior to encryption or after authorized decryption.

As used herein, the term "bootstrapping" refers to a cryptographic process within an FHE scheme for refreshing a ciphertext to restore its computational capacity. In particular, bootstrapping may increase or reset a ciphertext's available residue number system (RNS) level, reduce accumulated noise, and, in approximate-number schemes such as CKKS, normalize or reset the ciphertext's encoding scale. Bootstrapping typically involves a sequence of implementation-dependent sub-operations, including, by way of example and not limitation, modulus raising, coefficients-to-slots (C2S) transformations, evaluation of polynomial approximations (e.g., to a sine function), and slots-to-coefficients (S2C) transformations. Bootstrapping enables continued homomorphic computation on ciphertexts without decryption and is a foundational mechanism for supporting deep or long-running encrypted computations, such as the execution of large language models.

As used herein, the term "FHE ciphertext vector" refers to a ciphertext generated under a fully homomorphic encryption scheme that encodes a plurality of numerical values arranged across a fixed number of slots within the ciphertext. Each slot may represent a real or complex value, and the slots collectively support single-instruction-multiple-data (SIMD) style homomorphic computation. In the context of the present disclosure, an FHE ciphertext vector may encode multiple token representations, token embeddings, or intermediate model activations, with each token occupying a predetermined subset of slots according to a fixed packing layout. A FHE ciphertext vector may be processed as a unit by homomorphic operations, including ciphertext-plaintext arithmetic, slot rotations, rescaling, and bootstrapping, while preserving the relative slot positions of the encoded values.

As used herein, the term "generation-phase ciphertext" refers to a FHE ciphertext vector that encodes one or more generated tokens or token representations produced during a token generation phase of a multi-token large language model. Generation-phase ciphertexts are produced after an initiation or prompt-processing phase and represent encrypted outputs corresponding to newly generated token positions. In embodiments described herein, a generation-phase ciphertext may encode multiple tokens generated within a single transformer cycle, and such ciphertexts may be pipelined between a layer processor device and a bootstrap processor device for homomorphic layer processing and ciphertext bootstrapping. Generation-phase ciphertexts remain encrypted throughout processing and preserve token ordering and slot layout across successive homomorphic operations.

As used herein, the terms "layer processor" and "bootstrap processor" refer to functional roles performed by one or more accelerator processing units. A given hardware device, chip, card, or chassis may implement one or both roles, either concurrently or at different times.

The disclosed embodiments present a method and system for hardware-accelerated execution of multi-token large language models (LLMs) over fully homomorphic encryption (FHE). Rather than merely supporting multi-token generation or encrypted inference, the method and system implement a coordinated execution architecture that generates multiple tokens within a single transformer cycle, packs the generated tokens into FHE ciphertext vectors according to predetermined slot layouts, and processes the ciphertext vectors in a pipelined manner. By coordinating multi-token generation, ciphertext packing, and execution scheduling, the disclosed embodiments reduce per-token homomorphic computation overhead, particularly during the token-generation phase. Moreover, the method and system can pipeline homomorphic transformer-layer processing and ciphertext bootstrapping across distinct functional processing roles, including a layer processing role and a bootstrapping role, such that computation and cryptographic refresh operations are overlapped on different ciphertext vectors, thereby increasing throughput and reducing latency relative to naïve or sequential encrypted execution. Additionally, in embodiments employing multi-party fully homomorphic encryption (MP-FHE), the method and system can leverage jointly generated keys and collaborative decryption to enable secure batching across multiple users, thereby allowing multi-user encrypted inference without exposing plaintext data or requiring centralized trust.

The disclosed embodiments are operable for any computing architecture and should not be limited to any one hardware configuration, device form factor, or pipeline topology described herein. Functional roles described as layer processing or bootstrapping may be implemented on separate hardware components or on shared hardware resources, depending on the execution environment.

The disclosed method is not a mental process and cannot be performed entirely in the human mind. Rather, the method involves technical operations executed within a computing environment and is tied to specific technological implementations. For example, the method includes performing homomorphic computations on encrypted data without decryption using an FHE scheme, packing multiple token representations into FHE ciphertext vectors, and coordinating pipelined routing of encrypted data between functional processing roles associated with homomorphic layer execution and ciphertext bootstrapping.

The operation and effectiveness of the method depend on a variety of technical and cryptographic factors, including the homomorphic encryption scheme employed, ciphertext parameter selection, slot-packing layouts, noise-growth characteristics, and scheduling of ciphertext bootstrapping operations. In at least one embodiment, the method operates under multi-party FHE, in which cryptographic keys are jointly generated, and no single party possesses a complete secret key. The method may further dynamically adapt its execution based on compile-time parameters, pipeline configuration, and available hardware resources, requiring algorithmic control logic, cryptographic computation, memory management, and inter-device coordination that cannot be mentally performed by a human operator.

Although a human operator may supply an initial input, such as a prompt or query to be processed by a multi-token large language model, the execution of the method remains entirely rooted in automated processing by computing systems. The generation of a plurality of tokens, mapping of tokens into FHE ciphertext vectors, homomorphic evaluation of transformer layers, and ciphertext bootstrapping are all performed by the system without human intervention. These operations involve large-scale numerical computation, encrypted arithmetic, and coordinated execution across processing roles, which are beyond the capability of manual or mental execution.

Accordingly, the disclosed method is directed to a practical application of computer technology that solves a specific technical problem in the field of privacy-preserving computation and encrypted inference. In particular, it improves the efficiency and scalability of LLM execution under homomorphic encryption by enabling multi-token batching, ciphertext layout, and pipelined processing between layer-processing and bootstrapping roles, including in multi-party encryption environments. These improvements are achieved through execution-level mechanisms that are necessarily rooted in computing technology, and provide concrete performance and security benefits that are not achievable through mental processes or straightforward application of known techniques.

FIG. 1 illustrates an exemplary system architecture 100 for hardware-accelerated execution of large language models (LLMs) over fully homomorphic encryption (FHE) according to at least one embodiment. The system architecture 100 includes one or more layer processor devices 110, 110-*n* (hereinafter, layer processor device 110 in the singular or layer processor devices 110 in the plural), one or more bootstrap processor devices 130, 130-*m* (hereinafter, bootstrap processor device 130 in the singular or bootstrap processor devices 130 in the plural), and endpoint devices 140-1, 140-2, 140-*p* (hereinafter, endpoint device 140 in the singular or endpoint devices 140 in the plural), all connected via a network 120. As described herein, the layer processor devices 110 and bootstrap processor devices 130 represent functional processing roles that may be implemented on separate hardware components (as shown) or on shared hardware resources (not shown).

In FIG. 1, the depiction of the multi-token LLM 112 within the layer processor device 110 is intended to represent a logical execution context and model definition used by the layer processor device 110, rather than a standalone physical component.

A layer processor device 110 may include a single accelerator package or a plurality of cooperating accelerator packages. The layer processor device 110 is configured to perform homomorphic evaluation of transformer layers of a multi-token LLM 112 on encrypted data, including processing of multiple token representations that are batched and packed into encrypted data structures. In particular, the layer processor device 110 is further configured to operate on packed FHE ciphertext vectors that encode multiple token embeddings across predetermined slot subsets, thereby exploiting single-instruction-multiple-data (SIMD) style parallelism provided by a homomorphic encryption scheme.

Computation performed by the layer processor devices 110 may be distributed according to any suitable parallelization strategy, including but not limited to data parallelism, model parallelism, pipeline parallelism, or combinations thereof. For example, different layer processor devices 110 may process different FHE ciphertext vectors, different subsets of token slots within a ciphertext vector, or different groups of transformer layers. In at least one embodiment, encrypted outputs produced by one layer processor device 110 may be forwarded to another layer processor device 110 for further homomorphic layer evaluation.

The layer processor devices 110 are further configured to process encrypted data without decrypting underlying plaintext values and without access to secret decryption keys. The layer processor devices 110 may store or access model parameters, evaluation keys, and control logic required for homomorphic layer execution, while preserving the confidentiality of token values and intermediate representations. Accordingly, the layer processor device 110 implements layer-processing functionality corresponding to the multi-token LLM 112, operating entirely on encrypted representations.

As used herein, the multi-token LLM 112 represents a logical language model definition, including model parameters, layer topology, and multi-token generation semantics. The multi-token LLM 112 is not required to be implemented as a discrete physical module. Instead, the layers of the multi-token LLM 112 are evaluated on encrypted data by one or more layer processor devices 110 through compiled homomorphic programs and associated parameter tables. Compilation, scheduling, and optimization of the multi-token LLM 112 for execution over FHE are performed prior to runtime, and the layer processor devices 110 execute the resulting programs on encrypted data using generic or configurable FHE acceleration hardware (not shown in FIG. 1).

A bootstrap processor device 130 may include a single accelerator package or a plurality of cooperating accelerator packages. The bootstrap processor device 130 is configured to perform ciphertext bootstrapping operations on encrypted data produced by the layer processor device 110 or produced by the bootstrap processor device 130, including refreshing ciphertext noise, restoring modulus levels, and normalizing encoding scale. In at least one embodiment, bootstrapping operations may be applied to ciphertext vectors that encode multiple token representations, such that token batching and slot layout are preserved across refresh.

Bootstrapping workloads may be distributed across multiple bootstrap processor devices 130 to improve throughput or reduce latency. For example, different bootstrap processor devices 130 may bootstrap different ciphertext vectors or different stages of a pipelined encrypted inference process. In at least one embodiment, bootstrap processor devices 130 operate concurrently to service requests from one or more layer processor devices 110.

The bootstrap processor device 130 operates independently of model-specific semantic computation and does not require access to language model weights. In at least one embodiment, the bootstrap processor device 130 stores or accesses bootstrapping keys, cryptographic parameters, and control logic required to perform ciphertext refresh operations, while remaining agnostic to the semantic meaning of the encrypted data.

Figure 7:
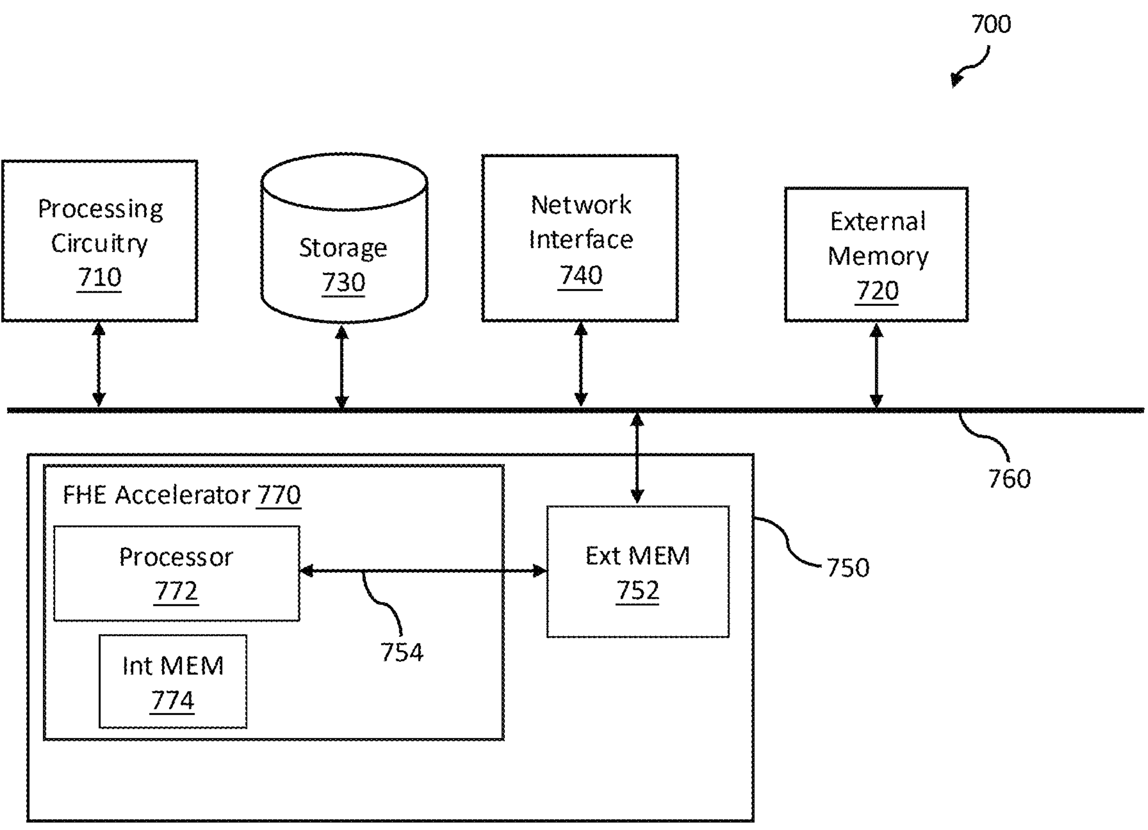
FIG. 7 is a block diagram showing an accelerator chassis incorporating an FHE accelerator according to at least one embodiment.

In at least one embodiment, the bootstrap processor device 130 incorporates an FHE accelerator (not shown in FIG. 1), as illustrated in FIG. 7, and described in greater detail during the discussion of FIG. 7. Moreover, the bootstrap processor device 130 hosts an FHE module 132 configured to manage cryptographic operations associated with homomorphic computation. In some embodiments, the layer processor device 110 may also incorporate an FHE accelerator and an FHE module 132. A given hardware device may therefore perform both layer processing and bootstrapping roles, either concurrently or at different stages of execution.

The fully homomorphic encryption (FHE) module 132 may provide bidirectional encrypted communication interfaces between functional layer processing and bootstrapping roles. In at least one embodiment, the FHE module 132 can be configured to manage cryptographic operations, including ciphertext bootstrapping, noise refresh, scale normalization, and secure transmission of encrypted data.

By coordinating homomorphic layer processing and ciphertext bootstrapping across these roles, the system 100 enables continuous homomorphic evaluation of the multi-token LLM 112 with an effectively unbounded computation depth, while preserving confidentiality of encrypted data.

The layer processor devices 110 and the bootstrap processor devices 130 are configured to operate in a pipelined and/or asynchronous manner, such that while one or more FHE ciphertext vectors undergo ciphertext bootstrapping, other ciphertext vectors are concurrently processed by homomorphic transformer layers. This coordinated pipelining improves overall system throughput and hardware utilization, particularly during the token-generation phase, while preserving ciphertext ordering and slot layout.

The multi-token LLM 112 is configured to generate or process a plurality of output tokens within a single inference cycle or transformer pass, rather than generating tokens strictly one at a time. In example embodiments, the plurality of tokens may include two, four, eight, or more tokens generated per cycle; however, such values are illustrative and non-limiting.

In at least one embodiment, the multi-token LLM 112 is configured to operate directly on encrypted token representations under FHE, with multiple token embeddings packed into a single FHE ciphertext vector. The model 112 thereby processes multiple tokens concurrently while underlying plaintext values remain encrypted.

A multi-token LLM 112 can include multiple functional layers, such as a perception layer, memory layer, reasoning layer, and orchestration layer. In at least one embodiment, one or more of these layers can be configured to operate on batched, packed, or block-wise token representations, including encrypted token embeddings stored across a plurality of slots of an encrypted vector. Such layers can apply shared transformations, attention mechanisms, or nonlinear operations across multiple token positions in parallel.

In at least one embodiment, a multi-token LLM 112 can encompass a variety of model types and architectures, each configured to process, generate, or analyze natural language data in either single-token or multi-token modes, including under encrypted computation. Such models can include, without limitation, statistical language models (e.g., n-gram models, hidden Markov models), neural network-based models (e.g., recurrent neural networks, long short-term memory (LSTMs) networks, gated recurrent units (GRUs)), and transformer-based models that employ self-attention mechanisms. In at least one embodiment, transformer-based models can be adapted to support multi-token emission under encryption, including by employing multiple output heads, block-wise decoding mechanisms, speculative or parallel decoding techniques, or other architectural modifications that allow prediction of multiple future token positions during a single forward pass on encrypted data.

In at least one embodiment, the multi-token LLM 112 can comprise an LLM trained on extensive corpora of text data using unsupervised, supervised, or reinforcement learning techniques. Suitable architectures may include encoder-only models (e.g., BERT-type architectures), decoder-only models (e.g., GPT-type architectures), and encoder-decoder models (e.g., T5-type or BART-type architectures), each of which may be configured to generate or process multiple tokens per inference cycle. Decoder-only models, for example, may be adapted to output encrypted multi-token sequences corresponding to successive positions in an autoregressive sequence, whereby multiple token embeddings are evaluated concurrently within packed ciphertexts.

In at least one embodiment, the system 100 can further incorporate multimodal language models capable of processing both textual and non-textual inputs (e.g., images, audio, structured data), as well as domain-specific language models fine-tuned for specialized applications such as legal, medical, or technical content analysis. In such embodiments, encrypted token batching can be applied across one or more modalities, enabling parallel processing of multiple output elements while preserving confidentiality of the underlying data.

The multi-token LLM 112 can be implemented using a variety of computational architectures and frameworks designed to perform logical inference, problem solving, or decision-making based on structured or unstructured data. Such models can include, without limitation, symbolic reasoning systems (e.g., rule-based engines, knowledge graphs, expert systems), probabilistic reasoning models (e.g., Bayesian networks, Markov logic networks, probabilistic graphical models), and neural reasoning models that employ deep learning architectures to approximate logical relationships. In at least one embodiment, such reasoning and inference operations can be performed over encrypted, multi-token representations, enabling multiple candidate outputs, hypotheses, or reasoning steps to be evaluated concurrently within a single encrypted computation cycle.

Endpoint devices 140 are user-associated computing devices configured to provide input data, participate in multi-party key generation, encrypt user data, and receive encrypted or decrypted outputs. Each endpoint device 140 may generate and retain a respective key share and jointly execute a distributed or threshold key-generation protocol to produce a joint shared public key under which encrypted data is processed by system 100. As such, no single endpoint device 140 possesses a complete secret key, enabling secure user batching and collaborative decryption without centralized trust.

In at least one embodiment, cloud computing infrastructure (not shown for purposes of simplicity) is implemented on the network, and a cloud computing environment (not shown for purposes of simplicity) is implemented/deployed on top of the cloud computing infrastructure. For example, in an embodiment, cloud computing infrastructure is from one cloud computing provider, such as Amazon® Web Services (AWS), Google® Cloud Services (GCS), Microsoft® Azure, Oracle Cloud®, IBM cloud®, and the like. In at least one embodiment, a cloud computing environment may be deployed in various configurations, including, but not limited to, public, private, hybrid, or edge-based configurations. In an embodiment, a cloud computing environment is a virtual private cloud (VPC), a virtual network (VNet), a virtual private network (VPN), a combination thereof, and the like.

Figure 2:
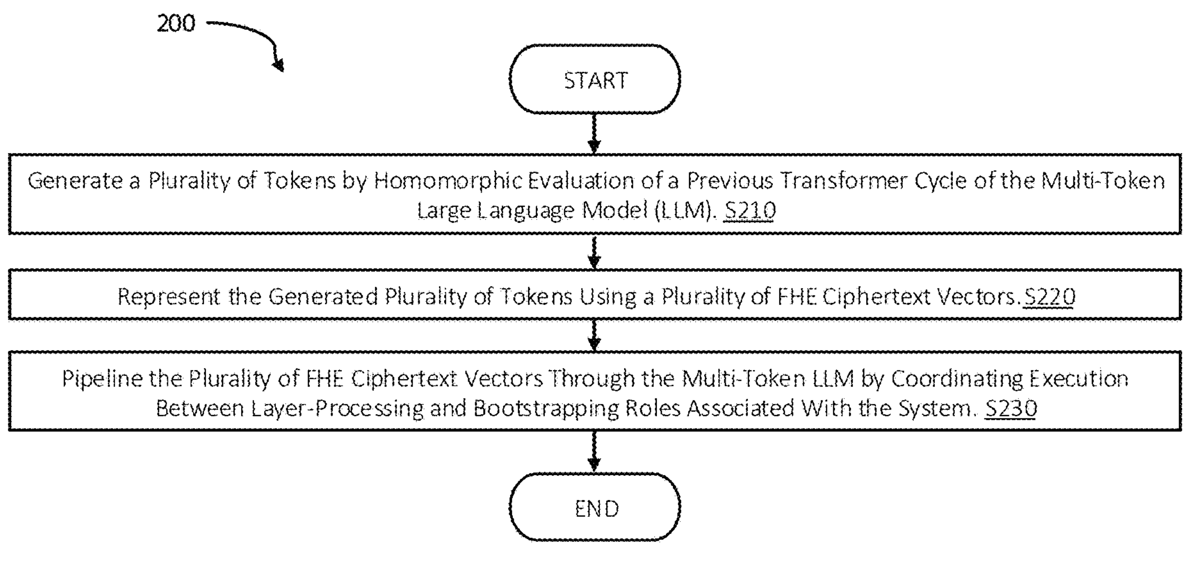
FIG. 2 is an operational flow chart illustrating a process for hardware-accelerated execution of a multi-token LLM over FHE according to at least one embodiment.

FIG. 2 is an example flowchart diagram illustrating a method 200, also referred to as a process 200, for hardware-accelerated execution of a multi-token large language model (LLM) over fully homomorphic encryption (FHE). In some embodiments, the method 200 may be performed by a system, such as system 100 shown in FIG. 1. The method 200 implements a coordinated execution process that enables efficient multi-token encrypted inference by mapping a generated plurality of tokens into FHE ciphertext vectors and pipelining the ciphertext vectors through functional layer-processing and bootstrapping roles associated with the multi-token LLM 112. The method 200 will be discussed with reference to the elements shown in FIG. 1.

At S210, a plurality of tokens is generated by homomorphic evaluation of a previous transformer cycle of the multi-token LLM 112. In the illustrated embodiment shown in FIG. 3A, the plurality of tokens includes eight tokens; however, the number of tokens is illustrative and non-limiting. In particular, the multi-token LLM 112 generates the plurality of tokens based on computed internal representations for the input context, including representations derived from prompt tokens and previously generated tokens, such as attention outputs, token embeddings, and positional encodings. In at least one embodiment, the multi-token LLM 112 emits multiple future tokens within a single transformer cycle, such that the plurality of tokens corresponds to successive token positions generated concurrently rather than sequentially.

Figure 3A:
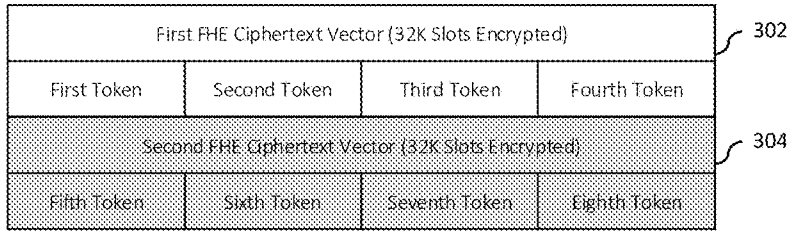
FIG. 3A illustrates an example table representation of a plurality of tokens mapped into multiple FHE ciphertext vectors, utilized to describe an embodiment.

At S220, the generated plurality of tokens is represented using a plurality of FHE ciphertext vectors, also referred to as generation-phase ciphertext vectors. In at least one embodiment, representing the plurality of tokens includes packing the plurality of tokens into one or more ciphertext vectors according to a predetermined slot layout. In the illustrated embodiment shown in FIG. 3A, a plurality of tokens including eight tokens is represented using two FHE ciphertext vectors, each encoding a subset of the tokens, such as four tokens per ciphertext vector; however, such quantities are illustrative and non-limiting. Each token occupies a predetermined subset of slots within the corresponding ciphertext vector according to the fixed packing layout. As illustrated in FIG. 3A, a first FHE ciphertext vector 302 includes 32K encrypted slots containing a first subset of tokens from the plurality of tokens, and a second FHE ciphertext vector 304 includes 32K encrypted slots containing a second subset of tokens from the plurality of tokens. This representation preserves token ordering and enables efficient utilization of FHE ciphertext slot capacity for parallel homomorphic processing.

In at least one embodiment, the plurality of tokens produced by the multi-token LLM 112 is already encoded within one or more FHE ciphertext vectors according to the predetermined slot layout as a result of a previous transformer cycle. In such embodiments, S220 includes maintaining or reusing the existing ciphertext layout without performing an explicit remapping or data-movement operation.

Figure 3B:
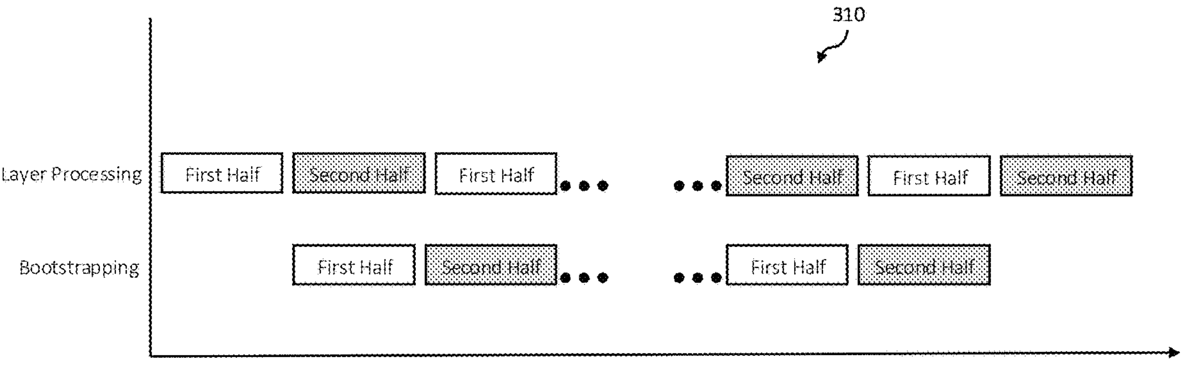
FIG. 3B illustrates an example graphical representation of pipelined processing of FHE ciphertext vectors between a layer processor device and a bootstrap processor device during hardware-accelerated execution of a multi-token LLM over FHE, utilized to describe an embodiment.

At S230, the FHE ciphertext vectors are pipelined through the multi-token LLM 112 by coordinating execution between layer-processing and bootstrapping roles associated with the system 100. In particular, a layer processor device 110, operating in a layer-processing role, executes homomorphic transformer-layer operations on at least one FHE ciphertext vector, while a bootstrap processor device 130, operating in a bootstrapping role, performs ciphertext bootstrapping operations on another FHE ciphertext vector according to a predefined schedule. The FHE ciphertext vectors are alternately routed between the layer processor device 110 and the bootstrap processor device 130, as illustrated in the example graphical representation 310 shown in FIG. 3B, such that homomorphic layer processing and ciphertext bootstrapping are performed concurrently on different ciphertext vectors. The coordinated pipelining improves throughput and hardware utilization during encrypted token generation.

Although FIG. 2 shows example blocks of the method 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 4:
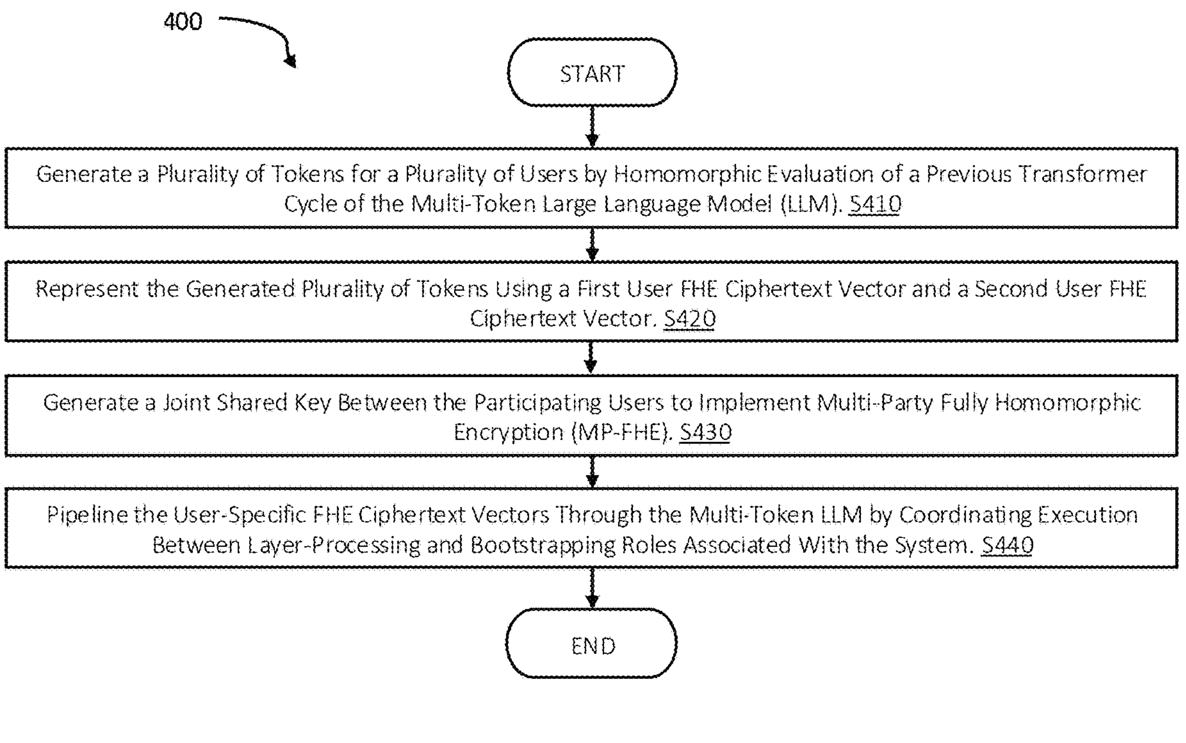
FIG. 4 is an operational flowchart illustrating a process for hardware-accelerated execution of a multi-token LLM over multi-party FHE (MP-FHE) according to at least one embodiment.

FIG. 4 is an example flowchart diagram illustrating a method 400, also referred to as a process 400, for hardware-accelerated execution of a multi-token large language model (LLM) over multi-party fully homomorphic encryption (MP-FHE) according to at least one embodiment. In some embodiments, the method 400 may be performed by a system, such as system 100 shown in FIG. 1. The method 400 implements a coordinated, privacy-preserving execution process that enables multi-user, multi-token encrypted inference by jointly encrypting user data and pipelining FHE ciphertext vectors through functional layer-processing and bootstrapping roles associated with the multi-token LLM 112. The method 400 will be discussed with reference to the elements shown in FIGS. 1 and 2.

At S410, a plurality of tokens is generated for a plurality of users by homomorphic evaluation of a previous transformer cycle of the multi-token LLM 112. In the illustrated embodiment shown in FIG. 5A, a plurality of tokens including four tokens is generated for each of two users; however, the number of users and the number of tokens per plurality of tokens are illustrative and non-limiting. In particular, the multi-token LLM 112 generates a first plurality of tokens based on computed internal representations corresponding to a first user (e.g., via endpoint device 140-1), and generates a second plurality of tokens based on computed internal representations corresponding to a second user (e.g., via endpoint device 140-2). In at least one embodiment, the multi-token LLM 112 emits multiple future tokens within a single transformer cycle, such that each plurality of tokens corresponds to successive token positions generated concurrently for the respective user.

Figure 5A:
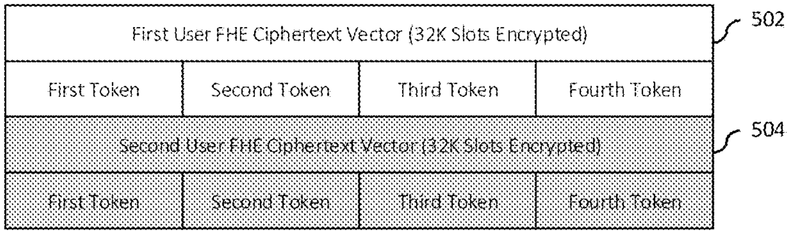
FIG. 5A illustrates an example table representation of pluralities of tokens associated with multiple users mapped into separate FHE ciphertext vectors under an MP-FHE context, utilized to describe an embodiment.

At S420, each generated plurality of tokens is represented using a corresponding FHE ciphertext vector, resulting in a first user FHE ciphertext vector and a second user FHE ciphertext vector, referred to collectively as generation-phase ciphertext vectors. In at least one embodiment, representing the plurality of tokens includes packing the plurality of tokens into each user-specific ciphertext vector according to a predetermined slot layout. Each FHE ciphertext vector encodes the tokens associated with the respective user, with each token occupying a predetermined subset of ciphertext slots according to the fixed packing layout. As illustrated in FIG. 5A, a first user FHE ciphertext vector 502 includes 32K encrypted slots containing the tokens of the first user's plurality of tokens within assigned slot subsets, and a second user FHE ciphertext vector 504 includes 32K encrypted slots containing the tokens of the second user's plurality of tokens within assigned slot subsets.

In at least one embodiment, the plurality of tokens produced by the multi-token LLM 112 is already encoded within one or more FHE ciphertext vectors according to the predetermined slot layout as a result of a previous transformer cycle. In such embodiments, S420 includes maintaining or reusing the existing ciphertext layout without performing an explicit remapping or data-movement operation.

At S430, a joint shared key is generated between the participating users to implement MP-FHE. In at least one embodiment, the joint shared key is generated using a distributed or threshold key-generation protocol, such that no single user possesses a complete secret key. The joint shared key enables homomorphic operations to be performed on the user-specific FHE ciphertext vectors while preserving confidentiality of each user's data and enforcing multi-party security guarantees, thereby enabling secure batching across users.

Figure 5B:
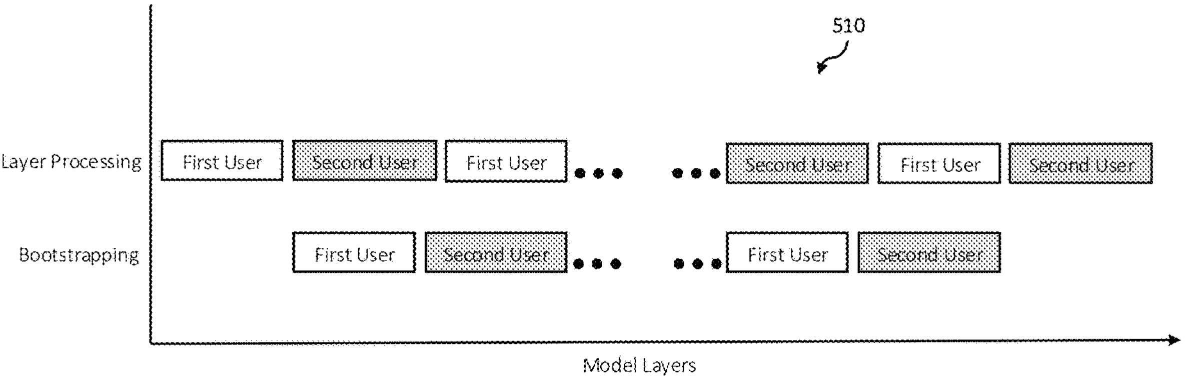
FIG. 5B illustrates an example graphical representation of pipelined processing of FHE ciphertext vectors between a layer processor device and a bootstrap processor device during hardware-accelerated execution of a multi-token LLM over MP-FHE, utilized to describe an embodiment.

At S440, the user-specific FHE ciphertext vectors are pipelined through the multi-token LLM 112 by coordinating execution between layer-processing and bootstrapping roles associated with the system 100. In particular, a layer processor device 110, operating in a layer-processing role, executes homomorphic transformer-layer operations on at least one FHE ciphertext vector, while a bootstrap processor device 130, operating in a bootstrapping role, performs ciphertext bootstrapping operations on another FHE ciphertext vector according to a predefined schedule. The FHE ciphertext vectors are alternately routed between the layer processor device 110 and the bootstrap processor device 130, as illustrated in the example graphical representation 510 shown in FIG. 5B, such that homomorphic layer processing and ciphertext bootstrapping are performed concurrently on different ciphertext vectors, while preserving user isolation, slot layout, and token ordering under the joint MP-FHE encryption context.

Although FIG. 4 shows example blocks of the method 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 6:
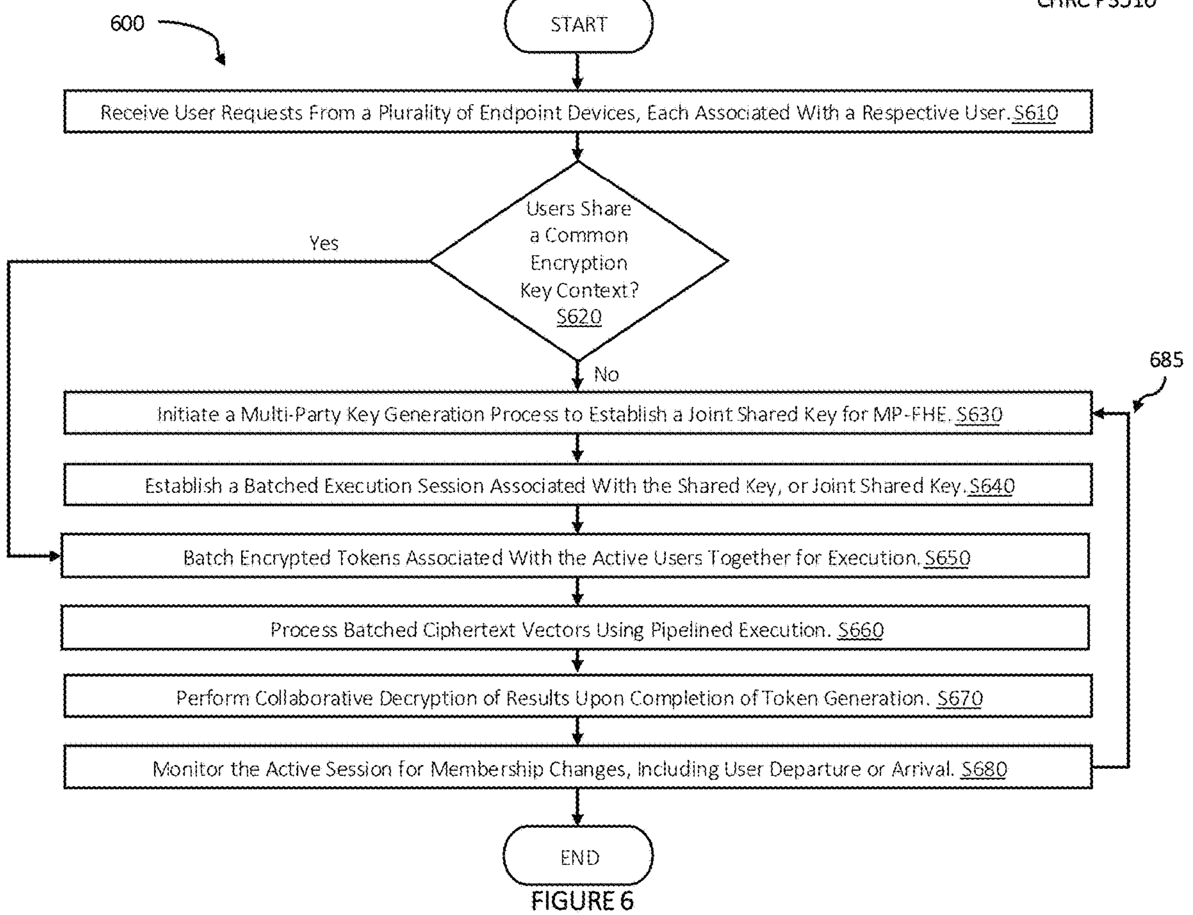
FIG. 6 is an operational flowchart illustrating a process for user batching and session-based execution of encrypted multi-token inference under FHE and MP-FHE, according to at least one embodiment.

FIG. 6 is an example flowchart diagram illustrating a method 600, also referred to as a process 600, for user batching and session-based management in a system 100 for hardware-accelerated execution of multi-token large language models (LLMs) over fully homomorphic encryption (FHE) and multi-party FHE (MP-FHE) according to at least one embodiment. In some embodiments, the method 600 may be performed by a system, such as system 100 shown in FIG. 1, in coordination with the multi-token execution methods described with respect to FIGS. 2 and 4. The method 600 enables secure batching of encrypted tokens across multiple users while preserving confidentiality, key isolation, and execution efficiency. The method 600 will be discussed with reference to the elements shown in FIGS. 1, 2, and 4.

At S610, one or more user requests are received from a plurality of endpoint devices 140, each associated with a respective user. Each request may include an encrypted prompt or input data and may be associated with a user-specific encryption key or key share.

At S620, it is determined whether the users associated with the received requests share a common encryption key context. In at least one embodiment, users belonging to a common organization or trust domain may encrypt data under a shared FHE key. When a shared key context exists (S620 "YES"), execution proceeds to step S650 to batch encrypted tokens directly under the shared key. When a shared key context does not exist (S620 "NO"), execution proceeds to step S630 to initiate a multi-party key generation process.

At S630, a multi-party key generation process is initiated to establish a joint shared key for MP-FHE. In at least one embodiment, the joint shared key is generated using a distributed or threshold key-generation protocol, such that no single user possesses a complete secret key.

At S640, a batched execution session associated with the shared key, or joint shared key, is established. The session defines a set of active users, associated key material, and execution parameters under which encrypted tokens may be jointly processed. The session remains active as long as the set of participating users remains unchanged.

At S650, encrypted tokens associated with the active users are batched together for execution. In at least one embodiment, batching includes grouping encrypted tokens from multiple users into generation-phase FHE ciphertext vectors, enabling efficient utilization of ciphertext slot capacity and amortization of homomorphic computation costs.

At S660, the batched ciphertext vectors are processed using pipelined execution between layer-processing and bootstrapping roles, as described with respect to FIGS. 2 and 4. The batched execution preserves user isolation, token ordering, and slot layout under the shared encryption context.

At S670, upon completion of token generation, collaborative decryption of results is performed. In MP-FHE embodiments, each participating user provides a partial decryption share, which are combined to recover plaintext outputs. In at least one embodiment, each user fully decrypts only its own output tokens.

At S680, the active session is monitored for membership changes, including user departure or arrival. When a membership change is detected, the existing session is terminated and, if required, a new key-generation process is initiated (as represented by arrow 685). In at least one embodiment, only a final group of tokens affected by the key change is recomputed under the updated session context.

Although FIG. 6 shows example blocks of the method 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is an example block diagram showing an accelerator chassis 700 incorporating a fully homomorphic encryption (FHE) accelerator 770, in accordance with various embodiments of the present disclosure. The accelerator chassis 700 includes a processing circuitry 710 coupled to a memory 720, a storage 730, a network interface 740, and an FHE card 750. In at least one embodiment, the components of accelerator chassis 700 may be communicatively connected via bus 760. The bus 760 may include, for example, a PCIe bus.

It should be understood that the term "accelerator chassis 700" is used herein in a functional sense and is not limited to a particular host-processor topology. In some embodiments, the chassis 700 comprises only accelerator blades or cards and is managed by an external host server that executes the application and issues management commands. In other embodiments, the chassis 700 further includes one or more host processors that both execute the application workload and coordinate the local accelerator blades. Any of the foregoing configurations fall within the scope of the present disclosure.

The processing circuitry 710 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing units (GPUs), system-on-a-chip systems (SOCs), general-purpose microprocessors, microcontrollers, digital signal processors (DSPs), and the like, or any other hardware logic components that can perform calculations or other manipulations of information.

The external memory 720 may be volatile (e.g., RAM, etc.), non-volatile (e.g., ROM, flash memory, etc.), or any combination thereof. This is distinct from the external memory 752 on the FHE card 750, which is specifically dedicated to supporting FHE operations. Examples of memory 720 may include EEPROM, ROM, PROM, RAM, DRAM, SRAM, flash memory, firmware, programmable logic, and so on.

The storage 730 may be magnetic storage, optical storage, and the like, and may be realized, for example, as flash memory or other memory technology, CD-ROM, Digital Versatile Disks (DVDs), hard drives, SSD, or any other medium which can be used to store the desired information, such as log of transactions, public keys, and so on.

In another embodiment, the memory 720 and/or storage 730 are configured to store software required to execute an FHE program or application, that is, software that requires the execution of an FHE scheme to perform one or more homomorphic operations. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by one or more processors, cause the processing circuitry 710 to perform the various processes described herein.

In one configuration, computer-readable instructions, i.e., code, needed to implement one or more embodiments disclosed herein, may be stored in the memory 720 and/or storage 730.

The network interface 740 is configured to enable the accelerator chassis 700 to communicate with external systems, utilizing various protocols, such as the Internet and/or a local area network. The network interface 740 communicates with these elements.

FHE card 750 is configured to rapidly perform complex homomorphic operations, including operations associated with ciphertext bootstrapping, noise management, scale normalization, and polynomial evaluation. The FHE card 750 may be deployed in a variety of configurations, including installation within an accelerator chassis 700, integration with a bootstrap processor device 130, integration with a layer processor device 110, or operation as a standalone hardware component. In at least one embodiment, the FHE card 750 includes an FHE accelerator 770 configured to perform high-throughput homomorphic computations in support of encrypted LLM inference.

The FHE accelerator 770 includes a processor 772 and an internal memory 774, or multiple processors with internal memory, designed to accelerate homomorphic encryption operations. Processor 772 may include multiple cores capable of managing multiple computation threads simultaneously. Internal memory 774 is dedicated to storing data for executing homomorphic encryption operations. Internal memory 774 is designed for high bandwidth, enabling quick access to stored data. It is realized as on-die memory.

In at least one embodiment, the FHE accelerator 770 can be realized as an ASIC. In other embodiments, the FHE accelerator 770 can be realized as an FPGA, ASSP, SoC, or other hardware logic components capable of performing calculations or other manipulations of information.

The FHE card 750 also includes external memory 752 and a memory bus 754. Memory bus 754 can be configured as a dedicated high-speed interface through which processor 772 communicates with external memory 752, enabling efficient data transfer during homomorphic encryption operations. Typically, external memory 752 is an SDRAM, high-bandwidth SDRAM (e.g., GDDR5, GDDR6), or high-bandwidth memory (HBM).

The FHE card 750 connects to the main components of the accelerator chassis 700 through bus 760 via a dedicated interface. This interface, typically implemented as PCIe, enables high-speed communication between the FHE card 750 and other components, such as processing circuitry 710 and external memory 720. As previously stated, bus 760 and an interface may be PCIe.

The FHE accelerator 770 is particularly suited for the computational demands of hardware-accelerated execution of multi-token large language models (LLMs) over fully homomorphic encryption (FHE), including multi-party FHE (MP-FHE). The FHE accelerator's 770 architecture supports the processing requirements of cloud-based deployments.

It should be understood that the embodiments described herein are not limited to the specific architecture illustrated in FIG. 7 and that other architectures may be equally used without departing from the scope of the disclosed embodiments.

The various embodiments disclosed herein can be implemented as any combination of hardware, firmware, firmware executing on hardware, software, software executing on hardware, or any combination thereof. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a micro-instruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the groups consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for hardware-accelerated execution of a multi-token large language model (LLM) over fully homomorphic encryption (FHE), comprising:

generating a plurality of tokens by homomorphic evaluation of a previous transformer cycle of the multi-token LLM;

representing the plurality of tokens using one or more FHE ciphertext vectors;

executing homomorphic transformer-layer operations on at least one of the one or more FHE ciphertext vectors using one or more layer processor devices; and performing ciphertext bootstrapping on at least another of the FHE ciphertext vectors using one or more bootstrap processor devices to refresh ciphertext noise and restore computational capacity, wherein the executing and performing steps are applied to different FHE ciphertext vectors.

2. The method of claim 1, further comprising:

coordinating pipelined routing of the FHE ciphertext vectors between the one or more layer processor devices and the one or more bootstrap processor devices, such that homomorphic transformer-layer processing and ciphertext bootstrapping are performed concurrently on different FHE ciphertext vectors during a token-generation phase.

3. The method of claim 1, wherein representing the plurality of tokens using one or more FHE ciphertext vectors comprises:

packing or maintaining the plurality of tokens in the one or more FHE ciphertext vectors according to predetermined slot layouts.

4. The method of claim 1, wherein ciphertext bootstrapping is performed according to a predefined schedule determined at compile time based on an expected noise-growth profile of the multi-token LLM.

5. The method of claim 2, wherein coordinating the pipelined execution comprises alternately routing FHE ciphertext vectors between the one or more layer processor devices and the one or more bootstrap processor devices.

6. The method of claim 2, wherein the one or more layer processor devices execute homomorphic transformer-layer operations on a first FHE ciphertext vector while the one or more bootstrap processor devices perform ciphertext bootstrapping on a second FHE ciphertext vector.

7. The method of claim 2, wherein the pipelined execution improves utilization of processing resources in the one or more layer processor devices and the one or more bootstrap processor devices and increases aggregate throughput during token generation relative to single-token processing.

8. The method of claim 1, further comprising:

receiving encrypted requests from a plurality of endpoint devices, each associated with a respective user.

9. The method of claim 8, further comprising:

determining whether a plurality of users share a common encryption key context.

10. The method of claim 9, wherein in response to determining that the plurality of users do not share the common encryption key context, the method further comprises:

generating a joint shared key using a multi-party fully homomorphic encryption (MP-FHE) protocol.

11. The method of claim 10, wherein generating the joint shared key comprises:

executing a distributed or threshold key-generation protocol such that no single user possesses a complete secret key.

12. The method of claim 11, further comprising:

establishing a batched execution session associated with the joint shared key, wherein the batched execution session defines an active set of users whose encrypted tokens are jointly processed.

13. The method of claim 12, wherein encrypted tokens associated with the active set of users are grouped into generation-phase FHE ciphertext vectors and processed using a pipelined execution.

14. The method of claim 11, further comprising:

performing collaborative decryption of encrypted output tokens, wherein each user provides a partial decryption share.

15. A system for hardware-accelerated execution of a multi-token large language model (LLM) over fully homomorphic encryption (FHE) comprising:

one or more hardware processors configured to:

generate a plurality of tokens by homomorphic evaluation of a previous transformer cycle of the multi-token LLM;

represent the plurality of tokens using one or more FHE ciphertext vectors;

execute homomorphic transformer-layer operations on at least one of the one or more FHE ciphertext vectors using one or more layer processor devices; and perform ciphertext bootstrapping on at least another of the FHE ciphertext vectors using one or more bootstrap processor devices to refresh ciphertext noise and restore computational capacity, wherein the executing and performing steps are applied to different FHE ciphertext vectors.

16. The system of claim 15, wherein the one or more processors are further configured to:

coordinate pipelined routing of the FHE ciphertext vectors between the one or more layer processor devices and the one or more bootstrap processor devices, such that homomorphic transformer-layer processing and ciphertext bootstrapping are performed concurrently on different FHE ciphertext vectors during a token-generation phase.

17. The system of claim 16, wherein the one or more processors, when coordinating the pipelined execution, are configured to alternately route FHE ciphertext vectors between the one or more layer processor devices and the one or more bootstrap processor devices.

18. The system of claim 16, wherein the one or more layer processor devices execute homomorphic transformer-layer operations on a first FHE ciphertext vector while the one or more bootstrap processor devices perform ciphertext bootstrapping on a second FHE ciphertext vector.

19. The system of claim 16, wherein the pipelined execution improves utilization of processing resources in the one or more layer processor devices and the one or more bootstrap processor devices and increases aggregate throughput during token generation relative to single-token processing.

20. The system of claim 15, wherein the one or more processors, when representing the plurality of tokens using one or more FHE ciphertext vectors, are configured to:

pack or maintain the plurality of tokens in the one or more FHE ciphertext vectors according to predetermined slot layouts.

21. The system of claim 15, wherein ciphertext bootstrapping is performed according to a predefined schedule determined at compile time based on an expected noise-growth profile of the multi-token LLM.

22. The system of claim 15, wherein the one or more processors are further configured to:

receive encrypted requests from a plurality of endpoint devices, each associated with a respective user.

23. The system of claim 22, wherein the one or more processors are further configured to:

determine whether a plurality of users share a common encryption key context.

24. The system of claim 23, wherein the one or more processors, when in response to determining that the plurality of users do not share the common encryption key context, are configured to:

generate a joint shared key using a multi-party fully homomorphic encryption (MP-FHE) protocol.

25. The system of claim 24, wherein the one or more processors, when generating the joint shared key, are configured to:

execute a distributed or threshold key-generation protocol such that no single user possesses a complete secret key.

26. The system of claim 25, wherein the one or more processors are further configured to:

establish a batched execution session associated with the joint shared key, wherein the batched execution session defines an active set of users whose encrypted tokens are jointly processed.

27. The system of claim 26, wherein encrypted tokens associated with the active set of users are grouped into generation-phase FHE ciphertext vectors and processed using a pipelined execution.

28. The system of claim 25, wherein the one or more processors are further configured to:

perform collaborative decryption of encrypted output tokens, wherein each user provides a partial decryption share.

29. A non-transitory computer-readable medium storing a set of instructions for hardware-accelerated execution of a multi-token large language model (LLM) over fully homomorphic encryption (FHE), the set of instructions comprising:

one or more instructions that, when executed by one or more processors of a device, cause the device to:

generate a plurality of tokens by homomorphic evaluation of a previous transformer cycle of the multi-token LLM;

represent the plurality of tokens using one or more FHE ciphertext vectors;

execute homomorphic transformer-layer operations on at least one of the one or more FHE ciphertext vectors using one or more layer processor devices; and perform ciphertext bootstrapping on at least another of the FHE ciphertext vectors using one or more bootstrap processor devices to refresh ciphertext noise and restore computational capacity, wherein the executing and performing steps are applied to different FHE ciphertext vectors.

* * * * *